United States Patent Office 2,910,863
Patented Nov. 3, 1959

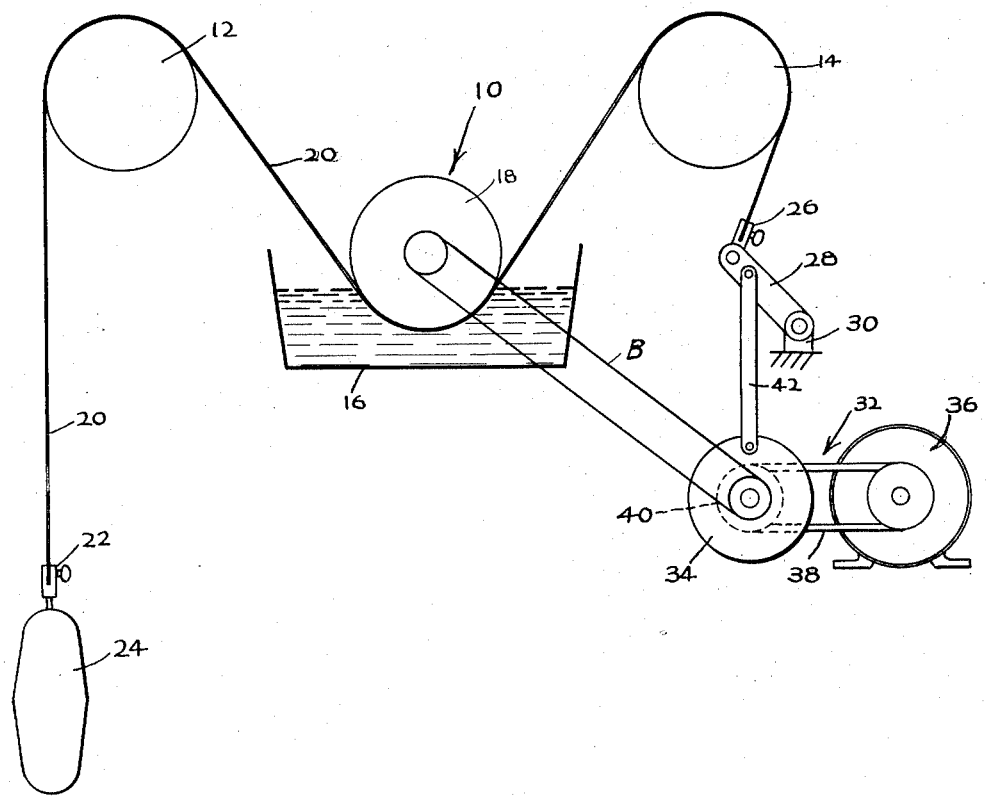

2,910,863

FOURDRINIER WIRE TESTING APPARATUS

Lloyd Hornbostel and Edgar J. Justus, Beloit, Wis., assignors to Beloit Iron Works, Beloit, Wis., a corporation of Wisconsin Application March 8, 1957, Serial No. 644,753

6 Claims. (Cl. 73—86)

This invention relates to testing apparatus and more particularly to apparatus for testing a Fourdrinier forming wire of a paper making machine for wear and corrosion.

Fourdrinier wires of paper making machines are characterized by a continuous band of reticulated finely drawn metal strands which are mounted for rotation between spaced rolls which may be of the suction type. In the conventional form of Fourdrinier machine, stock is deposited on the upper run of a wire and white water passes through the wire by gravity so that a web of paper is formed on the upper run. Sometimes spaced suction boxes are arranged in contact with the lower surface of the upper run to facilitate dewatering of the stock. It will be appreciated that a forming wire of this type is subject to considerable abrasion from contact with the suction boxes, and to corrosion because of the nature of the white water. Forming wires of this type are initially expensive to install and their replacement involves considerable cost particularly since the entire machine must be deactivated.

It is, accordingly, a primary object of the present invention to provide an apparatus for testing forming wires of this type to determine what additives may be employed in the white water to decrease this corrosion and to determine the wear characteristics of a particular type of wire.

Another object of the invention is to provide apparatus for testing forming wires of the type utilized in paper making machines which simulates the conditions of use of such a wire.

Another object of the invention is to provide apparatus for testing forming wire of the stated type in which a wire sample is subject to load conditions closely approximating the wear incurred while a wire is in use.

A further object of the invention is to provide apparatus for testing forming wires which are efficient and effective in operation and use and in which the apparatus involves the provision of structure characterized by convenience in form and improved functional characteristics.

A more particular object of the invention is to provide testing apparatus of the stated type in which a pair of pulleys are arranged in spaced relation above a container in which corrosive fluids such as white water and the like may be received and in which a pulley or roll is submerged, the wire being tested being trained over the first named pulleys, under the submerged pulley or roll, maintained in taut condition by a weight, and reciprocated through the fluid for a predetermined number of cycles so that the thickness thereof after testing may be compared with the thickness before testing as an indication of the wear and corrosion resisting characteristics of such a wire in an actual paper making machine.

Many other features, advantages and additional objects of the present invention will become manifest to those versed in the art upon making reference to the detailed description which follows and the accompanying drawing in which a preferred structural embodiment of a testing apparatus incorporating the principles of the present invention is shown by way of illustrative example.

On the drawing:

The sole figure of the drawing is an elevational diagrammatic view of a testing apparatus made in accordance with the present invention.

Referring now to the drawing, reference numeral 10 generally indicates the testing apparatus of the present invention. The apparatus 10 includes spaced pulleys or rolls 12, 14 which may be suitably mounted for rotation. A container or vessel 16 is interposed between the pulleys or rolls 12 and 14 below the axes thereof and in this container, in partially submerged relation, is a pulley or roll 18 which may be suitably mounted for rotation (e.g. driven by a drive belt B) or stationary, if desired.

A Fourdrinier wire 20 is trained over the rolls 12 and 14 and under the roll 18 so that a portion thereof is immersed in corrosive liquid received in the container 16. As pointed out previously, this corrosive liquid may take the form of white water, thus simulating actual conditions of operation of a paper making machine. Alternately, the liquid roll 18 may be rotatably mounted or fixed depending upon the nature of the test. Also, the roll 18 may be covered with the same material utilized to cover a suction flat box.

At one end of the wire 20 is a clamp 22 which is secured to a suitable weight 24. At the other end of the wire 20 is a clamp 26 which is pivotally connected to a lever 28, the other end of which is connected to a fixed lug 30. Reciprocation mechanism 32 which includes a disk 34 rotated by a motor 36 through the medium of a belt 38 and a pulley 40 (shown in dotted lines). Connected to the marginal edge of the disk 34 is one end of a crank arm 42, the other end of which is pivotally connected to the lever 28. Thus, upon rotation of the disk 34 the lever 28 and the wire 20 are subject to a reciprocating motion so that a predetermined portion of the wire is passed successively through the liquid. The roll 18 may be either rotatable or stationary, depending upon the degree of wear desired.

According to the method of the present invention, the forming wire 20 is trained over the rolls 12 and 14 and under the roll 18 and maintained in taut condition by the weight 24. As mentioned previously the wire is first tested for thickness, weight and the extent of the open area. After a predetermined number of passes of the wire through the liquid, the wire is removed from the apparatus and is tested as to thickness, weight and extent of open area. A comparison is then made with the pre-test values. The change in open area may be conveniently determined by conventional mesh tests or by the difference in the ability of the wire to pass light.

The above described apparatus furnishes a simple and effective means for testing a Fourdrinier type forming wire under conditions simulating actual service conditions of a forming wire. The present apparatus and method may be successfully utilized to determine the operating properties of a proposed new type of forming wire.

Although various minor structural modifications might be suggested by those versed in the art, it should be understood that we wish to embody within the scope of the patent warranted hereon all such modifications as reasonably and properly come within the scope of my contribution of the art.

We claim as our invention:

1. Apparatus for testing corrosion of sheet material such as the forming wire of a paper making machine and the like comprising a pair of spaced rolls, a third roll interposed between and below the level of said pair of rolls, a container for reception of corrosive liquid arranged in surrounding relation to said third roll so that said third roll is partially submerged in the corrosive liquid, said forming wire being trainable over said pair of spaced rolls and under said third roll, so that a portion of the wire is immersed in the liquid, means for maintaining the wire in taut condition, means for rotating said third roll, and means for reciprocating said wire through the liquid so that the degree of corrosion after a predetermined number of reciprocations may be accurately determined.

2. Apparatus for testing wear and corrosion of sheet material such as the forming wire of a paper making machine and the like comprising a pair of spaced rolls, a third roll interposed between and below the level of said pair of rolls, a container for reception of corrosive liquid arranged in surrounding relation to said third roll so that said third roll is partially submerged in the corrosive liquid, said forming wire being trainable over said pair of spaced rolls and under said third roll so that a portion of the wire is immersed in the liquid, means including a weight for maintaining the wire in taut condition, means for constantly rotating said third roll, and means for reciprocating said wire through the liquid so that the degree of corrosion and the extent of wear after a predetermined number of reciprocations may be accurately determined.

3. Apparatus for testing wear and corrosion of sheet material such as the forming wire of a paper making machine and the like comprising a pair of spaced rolls, a third roll interposed between and below the level of said pair of rolls, a container for reception of corrosive liquid arranged in surrounding relation to said third roll so that said third roll is partially submerged in the corrosive liquid, said forming wire being trainable over said pair of spaced rolls and under said third roll so that a portion of the wire is immersed in the liquid, means including a weight attached to one free end of said wire for maintaining the wire in taut condition, means for rotating said third roll, and means attached to the other end of said wire for reciprocating said wire through the liquid so that the degree of corrosion and the extent of wear after a predetermined number of reciprocations may be accurately determined.

4. Apparatus for testing the effect of wear on sheet material such as the forming wire of a paper making machine comprising means including a plurality of spaced rolls and a weight for maintaining the forming wire in taut condition, one of said rolls being arranged below the level of the others of said rolls and being partially submerged in liquid received in a suitable container, said forming wire being trainable over the elevated rolls and under said lower roll, means for constantly rotating said lower roll, and means for reciprocating the wire against said rolls and through the liquid so that the extent of wear after a predetermined number of reciprocations may be accurately determined.

5. Apparatus for testing the effect of wear on sheet material such as the forming wire of a paper making machine comprising means including a plurality of spaced rolls and a weight attached to one free end of the forming wire for maintaining the forming wire in taut condition, one of said rolls being arranged below the level of the others of said rolls and being partially submerged in liquid received in a suitable container, means for constantly rotating the lower roll in one direction, and means for reciprocating the wire against the lower roll of said rolls and through the liquid so that the extent of wear after a predetermined number of reciprocations may be accurately determined.

6. Apparatus for testing the corrosive effect of particular liquids and the effect of wear on sheet material such as the forming wire of a paper making machine comprising means including a plurality of spaced rolls and a weight attached to one free end of the forming wire for maintaining the forming wire in taut condition, one of said rolls being arranged below the level of the others of said rolls and being partially submerged in corrosive liquid such as white water and the like received in a suitable container, means for constantly rotating the lower roll in one direction, and means for reciprocating the wire against said one of said rolls and through the liquid so that the degree of corrosion and the extent of wear after a predetermined number of reciprocations may be accurately determined.

References Cited in the file of this patent
UNITED STATES PATENTS

| | | |
|---|---|---|
| 2,660,055 | Thommen | Nov. 24, 1953 |
| 2,696,736 | Frederick | Dec. 14, 1954 |

FOREIGN PATENTS

| | | |
|---|---|---|
| 873,450 | Germany | Apr. 13, 1953 |